Floyd L. Scott, Inventor
By Jesse R. Stone, Attorney

Patented Feb. 12, 1929.

1,702,060

UNITED STATES PATENT OFFICE.

FLOYD L. SCOTT, OF HOUSTON, TEXAS.

SCREW-OPERATED VALVE.

Application filed July 11, 1927. Serial No. 204,970.

My invention relates to valves employed in core drills for use in deep wells. It has particular reference to slowly closing valves adapted to close the upper end of the core barrel when the core is being cut.

It is an object of the invention is provide a valve which will remain in open position when the drill is being introduced into the well, but which may be closed by action of the rotation of the drill when the tool is in position to begin drilling.

It is desired that the valve close but slowly so that the lower end of the tool be cleaned of mud before the core is taken.

The invention contemplates a valve which is moved onto its seat through the action of a screw rotated by mechanically operated rollers actuated by the rotation of the drill.

Referring to the drawing herewith, Fig. 1 is a central vertical section through a core drill employing my invention, said section being on the plane 1—1 of Fig. 2.

Figure 1:
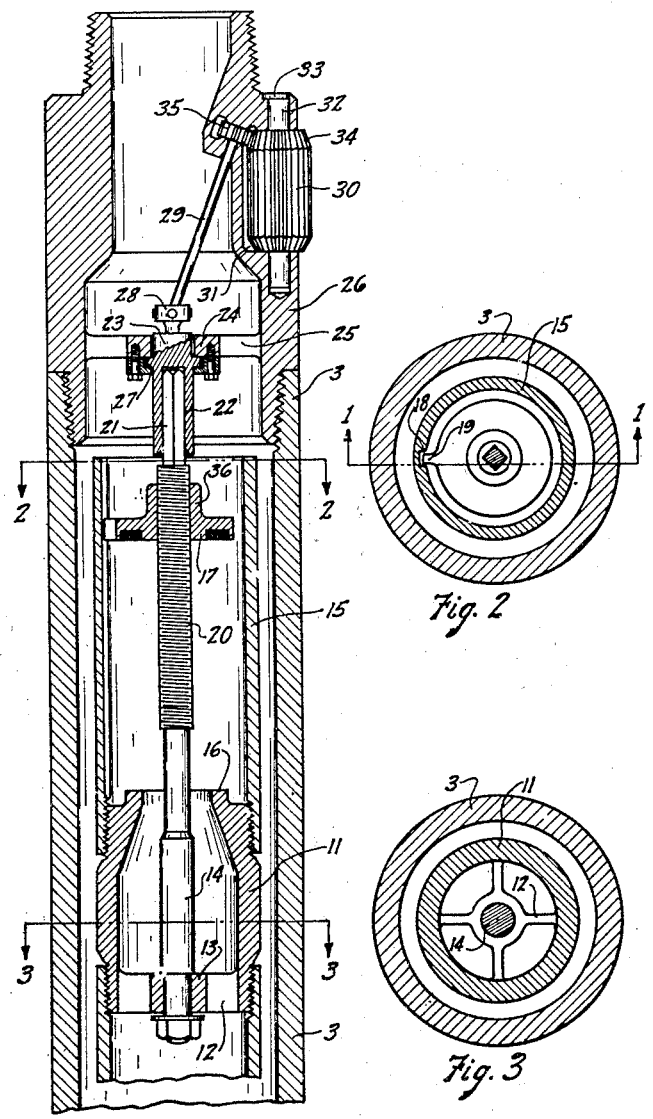
Figure 2:
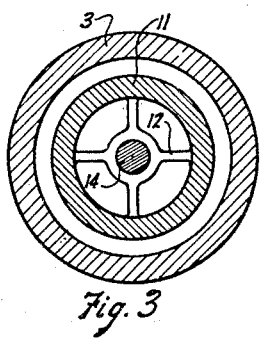
Fig. 2 is a transverse section on the plane 2—2 of Fig. 1.
Figure 3:
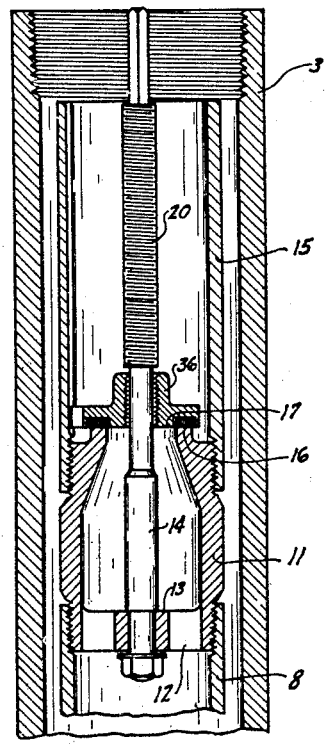
Fig. 3 is a transverse section on the plane 3—3 of Fig. 1.
Figure 4:
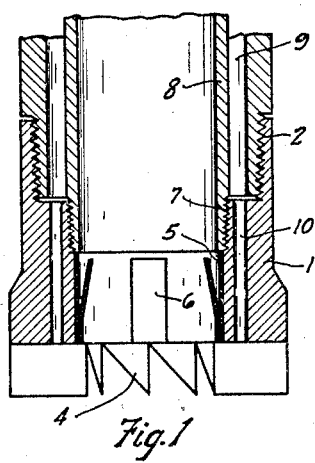
Fig. 4 is a fragmentary vertical section showing the valve in closed position.

The core drill employed may be any common type of drill and I have shown a scraping rotary drill having a head 1, of tubular form with its upper shank 2 threaded to engage a drill collar 3. The forward end of the drill is toothed at 4 and, above the teeth within the core opening, is a core catcher 5 with spring fingers 6 thereon to engage the core. The interior of the head is threaded at 7 to receive the core barrel 8 which is spaced from the drill collar to form an annular chamber 9 to which channels 10 in the head are connected to allow discharge of flushing fluid.

The core barrel is connected, at its upper end, to a guide barrel 15, by means of a coupling 11. Said coupling has a spider 12 at its lower end supporting a hub or bearing 13, which in turn supports a rod 14, extending axially upwardly within the guide barrel 15. The interior surface of the coupling is tapered upwardly at its upper end and an annular seat 16 is formed thereon to receive a valve 17.

The guide barrel 15 is open at its upper end which is extended for a predetermined distance above the valve seat. The barrel serves to guide the valve 17. It has a groove or keyway 18 at one side to receive a tenon or key on the valve so as to prevent rotation of said valve, the body of the valve being spaced from the walls of the guide barrel to allow free flow of flushing fluid past the valve when the valve is open.

The valve 17 is a disc shaped plate with a packing groove on its lower face to fit upon the valve seat. It has a central hub 19 which is threaded to engage the threaded portion 20 of the rod 14 so that when said rod is rotated, the valve will be moved thereon, in a direction depending upon the direction of rotation of the rod.

The threaded portion 20 of the rod is of slightly larger diameter than the portions above and below the threaded portions as will be noted. The upper end of the rod is squared at 21, to fit slidably within a squared socket 22 on a rotatable shaft 23.

The shaft 23 is secured rotatably within a bearing 24 formed centrally of a spider 25 formed integrally within a bushing 26 coupled at the upper end of the drill collar 3.

The bearing 24 fits about the head of the shaft 23, said shaft having a flange 27, cooperating with the bearing to retain the shaft rotatably in position. The upper end of the shaft has thereon, a universal connection at 28 with a shaft 29.

The bushing 26 has a toothed roller 30 mounted rotatably within a socket 31 in said bushing. It has a vertical bearing pin 32 fitting into the upper and lower ends of the socket, the head 33 of the pin being eccentric to avoid rotation of the pin.

The roller 30 has beveled or tapered upper and lower ends 34 with teeth thereon. The upper end 34 engages with a gear 35 upon the shaft 29 so that the rotation of the roller will cause the operation of the shaft 29 and the screw rod 20.

Thus, when the drill is lowered to the bottom of the hole, the valve 17 will be at the upper end of the guide barrel, and mud may enter the drill stem. When the bottom is reached, the drill will be washed free of foreign material and will then be rotated to screw the valve slowly to its seat. This will act, when the valve is screwed off the threaded portion of the rod, to close the valve but will leave the valve free to lift under pressure from below.

By the use of this valve, it will be noted that the core barrel and the bottom of the well may be thoroughly cleaned before a core is taken, and the valve will assist in maintaining the core free of fluid after the drilling is started.

What I claim as new is:

1. A core drill including a core barrel, a guide barrel, a coupling connecting said barrels, a valve seat on said coupling, a screw rod on said coupling, a valve threaded on said rod, and means actuated by the rotation of said drill to screw said rod and move said valve.

2. A core drill including a core barrel, a guide barrel, a coupling connecting said barrels, a valve seat on said coupling, a screw rod on said coupling, a valve threaded on said rod, and means actuated by the rotation of said drill and including a roller operatively connected with said screw rod to screw said rod and move said valve.

3. A core drill including a core barrel, a guide barrel, a coupling connecting said barrels, a valve seat on said coupling, a screw rod on said coupling, a valve threaded on said rod, means on said valve engaging means on said guide barrel to prevent rotation of said valve, and means actuated by the rotation of said drill to screw said rod and move said valve.

4. A core drill, a core barrel thereon, a valve adapted to close the upper end thereof, means inculding a screw rod engaging said valve to hold said valve from its seat and means to rotate said rod, said means being responsive to the rotation of said drill to move said valve slowly into its closed position.

5. A core drill, a core barrel thereon, a valve adapted to close the upper end of said barrel, a screw rod on said core barrel, a valve on said rod, a roller positioned to engage the wall of the well to roll thereon, and operative connections between said roller and said screw rod for the purpose stated.

In testimony whereof, I hereunto affix my signature, this the 5th day of July, A. D. 1927.

FLOYD L. SCOTT.